Jan. 21, 1958 R. ARONSTEIN 2,820,918
OPTICAL DEVICE FOR THERAPEUTIC AND OTHER PURPOSES
Filed Oct. 14, 1955
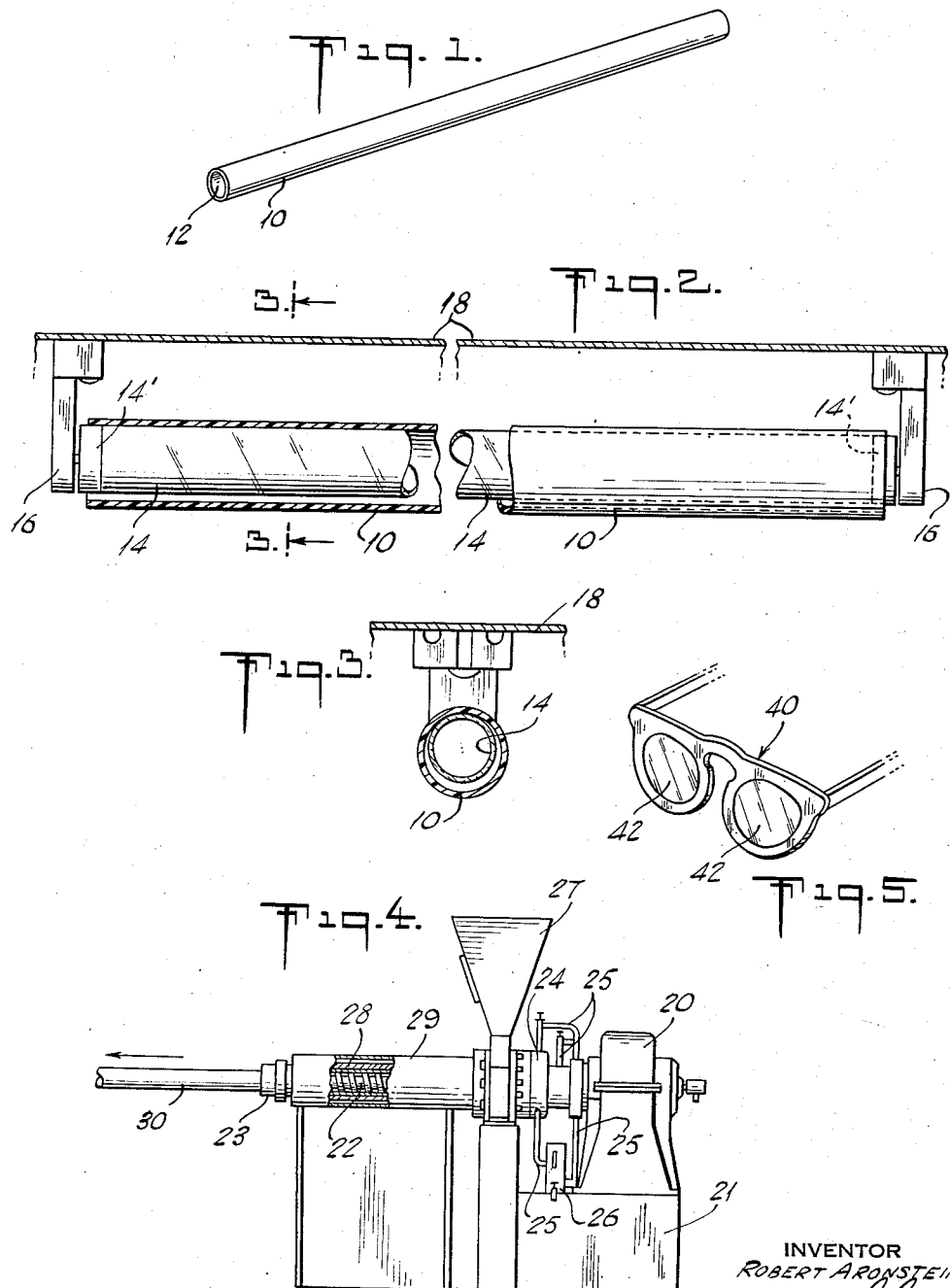
INVENTOR
ROBERT ARONSTEIN
BY
ATTORNEY

United States Patent Office 2,820,918
Patented Jan. 21, 1958

2,820,918
OPTICAL DEVICE FOR THERAPEUTIC AND OTHER PURPOSES

Robert Aronstein, Brooklyn, N. Y.

Application October 14, 1955, Serial No. 540,518

4 Claims. (Cl. 313—108)

This invention relates to optical devices and more specifically to an improved device for therapeutic and other purposes that is particularly useful with fluorescent lighting devices to reduce glare, eye strain and skin injury and effect more restful and desirable illumination. The invention further pertains to the method of manufacture of such devices.

Fluorescent lighting has become quite widely used today because it affords an efficient source of light more nearly approaching the characteristics of daylight. However, it has been found that the transmittance of ultraviolet radiations more commonly known and hereafter referred to as ultra-violet light, and the composition of the visible light constitute serious disadvantages and while numerous efforts have been made to improve fluorescent lighting through the use of diffusers, pigmented glass and the like, the results have not been satisfactory. Accordingly one object of the invention is to overcome the disadvantages of fluorescent lighting while retaining its advantages of high efficiency and a more natural light. This is attained in part through the use of improved means for absorbing or removing ultra-violet light to reduce the danger of eye and skin injury thus providing a softer light and in part through discrimination against the yellow-orange region of the spectrum.

Another object of the invention is the provision of an improved ultra-violet light absorbing means alone and in combination with color discriminating pigments for fluorescent lights, eye glasses and the like that may be in the form of a separate element or in the case of lighting fixtures formed integrally with the lamp itself which will almost entirely eliminate ultra-violet light and at the same time improve the illuminating characteristics of the light source.

Still another object of the invention is an improved tubular shield for fluorescent lights that almost entirely eliminates glare and absorbs ultra-violet light emitted by the light source.

A further object of the invention resides in the provision of a tubular extruded shield for fluorescent lights that discriminates against the yellow-orange region of the spectrum and absorbs ultra-violet light.

A still further object of the invention is an improved method for making an extruded shield and other optical devices for light sources wherein materials for absorbing ultra-violet wave lengths and discriminating against certain wave lengths of visible light are incorporated in the material extruded to form the shield or other device.

Still another object of the invention is an improved shield for fluorescent lamps.

A further object of the invention is an improved method of shielding fluorescent light sources.

A still further object of the invention is an improved lens for eye glasses, goggles and the like.

The above and other objects and advantages of the invention will become more apparent from the following description and accompanying drawings forming part of this application.

In the drawings:

Fig. 1 is a perspective view of an optical device in accordance with one embodiment of the invention;

Fig. 2 is a side elevation in partial section of a lighting fixture embodying an optical device in accordance with one embodiment of the invention;

Fig. 3 is a cross sectional view of the embodiment shown in Fig. 2 taken along the lines 3—3 thereof;

Fig. 4 is a side elevational view in partial section of apparatus that may be used for the fabrication of a shield shown, for instance, in Fig. 1; and Fig. 5 is a perspective view of eye glasses having lenses in accordance with the invention.

With the widespread use of fluorescent light for illumination in both the home and office efforts have been made to reduce eye strain caused by specular glare and the presence of ultra-violet light. While this type of light continues in use because of its relatively high efficiency, known devices or light discriminators that have been used in order to reduce eye strain have not been found to be wholly satisfactory with the result that in many applications the use of fluorescent lighting is limited. It has been found that the one cause of glare and eye strain in lamps of this type is the presence of excessive light in the yellow-orange region and that this condition is further aggravated by the relatively large amounts of radiated ultra-violet light. Through the utilization of a shield preferably wholly surrounding or enclosing a source of fluorescent light and which discriminates both against light in the yellow-orange region as well as in the ultra-violet region a soft relatively true daylight effect is obtained. While this shield reduces to some extent the available illumination by reason of the modification of the color distribution of the light, through the substantial reduction of ultra-violet light improved illumination is nevertheless obtained and a person can work for greater periods of time under such illumination with materially less eye strain. The removal of ultraviolet light is of considerable importance since it has been found that fluorescent lighting may not only cause conjunctivitis but may also result in serious irritation of the skin.

Another important aspect of the invention resides in the construction of the optical device wherein the filtering material for both discrimination against the yellow-orange region of the spectrum as well as for absorption of the ultra-violet light may be contained wholly within the filter material itself thus protecting the filtering materials against wear and abrasion and at the same time enabling it to be washed without adversely affecting its performance. In this way light discriminators in the form of tubes or other configurations for elongated fluorescent lights can be directly extruded with the absorber alone or with colored pigments formed as an integral part thereof. As a result fluorescent shields and other optical devices in accordance with the invention can be made far more economically and more uniformly than heretofore. In the case of lenses for optical systems, eye glasses, goggles and the like the material can of course be extruded or otherwise produced in sheet form.

While therapeutic optical devices in accordance with the invention may be made in any desired manner of glass, plastic or other suitable translucent or transparent material, they are preferably extruded with the filter materials mixed with a plastic prior to the extrusion process. For the purpose of obtaining discrimination in the yellow-orange region of the spectrum any suitable blue green pigment may be employed and mixed with the powdered or liquid materials of which the optical body is to be formed by the extrusion process. Absorption of the ultra-violet light is obtained by the inclusion of a substituted benzophenone such a hydroxybenzophenone or the like in the mixture prior to the actual extrusion. It has been found that the relatively high temperatures required for the extrusion, for instance, of plastic will not adversely affect the absorber so that a highly effective and efficient device can be obtained without the necessity of subsequent coating procedures after the fabrication of the tubes or other filter elements. It is to be understood of course that the filtering pigments and ultra-violet light absorbers may be formed as a coating on a suitable transparent or translucent material or equivalent filtering may be obtained by suitable coatings on or in the glass forming the fluorescent lamp itself.

Referring now to the drawings and more specifically to Figs. 1 to 3 thereof, the preferred embodiment of a fluorescent shield in accordance with the invention is in the form of a cylindrical tube 10 having an opening 12 extending therethrough of slightly larger diameter than the fluorescent tube 14. The tube 14 is supported in a conventional manner by a pair of end brackets 16 that serve both as a mechanical support for the lamps 14 as well as the electrical connections therefor. The bracket 16 may be secured to any suitable plate 18 or other fixture holding one or more tubes in parallel. The shield 10, which may be of either transparent or translucent material having the light discriminating pigments and ultra-violet absorber contained therein, is placed over the fluorescent tube 14 as shown in Fig. 2. Because of its relatively light weight it can be supported directly by the end portions 14' of the fluorescent tube 14 in which case the bottom portion of the shield 10 will be spaced slightly from the tube 14. The position of the fluorescent lamp 14 and the surrounding shield 10 may be seen more clearly from the cross sectional view shown in Fig. 3.

As pointed out above the preferred embodiment of the invention constitutes a shield or other optical device having the light discriminating and absorbing materials substantially homogeneously distributed throughout the body thereof. This may be accomplished by any suitable extrusion apparatus such as that illustrated, for instance, in Fig. 4 for the extrusion of elongated tubular filters.

This apparatus comprises essentially a motor driven speed reducer 20 mounted on a suitable base 21 and coupled with a screw 22 arranged to force the plastic material being molded through the die 23. The right hand end of the screw 22 is provided with a large thrust bearing 24 having lubricating conduits 25 and a pump 26 for circulation of the lubricant. Just to the left of the thrust bearing 24 is a hopper 27 in which the plastic compound to be molded is placed. This compound is preferably in a powder form and is fed forwardly by the screw 22 within the composite cylinder 28 formed of two cylindrical members disposed one within the other. It will be observed that the screw 22 closely engages the inside diameter of the tubular member 28 and that the plastic material being molded is carried forwardly in the spaces between the root of the screw 22 and the inside of the tubular member 28. The screw 22 and surrounding tubular member 28 are enclosed by an outer housing 29 which preferably includes suitable heating means for transforming the plastic powder into a molten or semi-molten condition required for extrusion and suitable cooling means for lowering the temperature of the plastic as it is moved through the forming die 23, the latter being of conventional construction.

The illustrated extruding apparatus is particularly intended for use of a plastic powder and in accordance with the invention suitable pigments are embodied in and intermixed with the powder for attenuating the yellow-orange portion of the spectrum and for absorbing ultra-violet radiations. In this way the finished tubing 30 need only be cut into the desired lengths to form individual shields 10 ready for installation about a fluorescent light source. It has been found in actual practice that through the utilization of a substituted benzophenone as an ultra-violet absorber and conventional pigments for filtering out at least part of the yellow-orange portion of the spectrum that the heat required for the extrusion process has little or no effect on these additives with the result that the cost of a shield, for instance, can be materially reduced and its effectiveness vastly improved over prior methods requiring a separate coating either on the lamp itself or on a separate translucent or transparent element for absorbing or filtering the light. In addition it has been found that substituted benzophenones constitute extremely stable and efficient ultra-violet absorbers that can be readily mixed with conventional pigments to attain the ends of this invention and have been found to be superior to other chemicals utilized for the absorption of ultra-violet light. Moreover, the combination of this ultra-violet absorber together with an attenuator for the orange-yellow region of the spectrum results in a vastly improved light source closely approximating daylight that is soft and free of glare and other harmful radiations normally emanating from fluorescent light source that adversely affect the eyes.

Another important aspect of the invention resides in the utilization of a material formed in accordance with the invention as lenses for eye glasses and other eye protecting devices. This is illustrated in Fig. 5 wherein a conventional eye glass frame 40 is provided with a pair of lenses 42 formed in substantially the same manner as the light shield 10 shown in Figs. 1 and 2. The lenses 42 may include an ultra-violet light absorber in the manner previously described which reduces the ultra-violet light striking the eye. If desired however, the lenses 42 may include pigments discriminating against the yellow-orange region or other regions of the spectrum. While lenses of this character are particularly useful for all types of eye glasses they are of course particularly useful for persons subjected to light having a substantial amount of ultra-violet rays.

It is to be understood that while in the preferred embodiment of the invention the ultra-violet absorber alone or with pigments are incorporated within the optical device or shield itself that such materials may be deposited on a suitable shield or on a lamp itself in the form of a separate layer suitably protected against mechanical abrasion. Moreover the invention is also applicable to cathode ray oscilloscopes, eye glasses, and other optical filtering devices. In addition it is apparent that other modifications, changes and alterations may be made without departing from the true scope and spirit of this invention.

What is claimed is:

1. A shield for a tubular fluorescent light source comprising a tube of light transmitting material having an inside diameter slightly larger than the outside diameter of the lamp, and means on said tube for absorbing ultra-violet light emitted by said light source and for discriminating against light in the yellow-orange region of the spectrum.

2. A shield according to claim 1 wherein said tube is formed of extruded plastic material and said ultra-violet light absorbing means is substantially uniformly distributed throughout said material.

3. The combination with a fluorescent light source of a shield comprising a body of light transmitting material and means distributed substantially uniformly throughout said material for absorbing ultra-violet light and for discriminating against light in the yellow-orange region of the spectrum.

4. The combination according to claim 3 wherein said ultra-violet light absorber is a substituted benzophenone.

References Cited in the file of this patent

UNITED STATES PATENTS

| | | |
|---|---|---|
| 2,122,285 | Holst et al. | June 28, 1938 |
| 2,178,436 | Ruttenauer | Oct. 31, 1939 |
| 2,290,186 | Holman et al. | July 21, 1942 |
| 2,299,720 | Holman | Oct. 20, 1942 |
| 2,333,085 | Abadie | Nov. 2, 1943 |
| 2,382,939 | Koch | Aug. 14, 1945 |
| 2,461,464 | Aronstein | Feb. 8, 1949 |
| 2,774,903 | Burns | Dec. 18, 1956 |

FOREIGN PATENTS

| | | |
|---|---|---|
| 474,907 | Great Britain | Nov. 9, 1937 |